May 21, 1968  J. D. STALTER  3,383,901

METHOD OF FORMING COMPLEX TUBING SHAPES

Filed April 25, 1966

INVENTOR.
JOHN D. STALTER
BY
ATTORNEYS

United States Patent Office 3,383,901
Patented May 21, 1968

3,383,901
METHOD OF FORMING COMPLEX TUBING SHAPES
John D. Stalter, Elkhart, Ind., assignor to Nibco, Inc., Elkhart, Ind., a corporation of Indiana
Filed Apr. 25, 1966, Ser. No. 544,969
6 Claims. (Cl. 72—370)

This invention relates to metal working, and more particularly to an improved method of forming wrought, branch type fittings from a tubular blank by pressure applied to an internal plastic filler material.

The assignee herein is the owner of or is familiar with several United States patents relating to processes and apparatus for forming fittings from tubular blanks by internally applied pressure, including Patent Nos. 2,111,695, 2,027,285, 2,557,403, 2,603,175, 3,735,389 and 2,827,007. The related methods and apparatuses described and claimed in these patents present a very substantial advance over the previous technology. However, usage and experimentation over the years with the basic method and its improvements have shown that some specific and definite disadvantages exist which raise substantial problems from a practical manufacturing standpoint. Briefly, these methods are based on the concept of using plastic filler slug which is a solid at room temperature, yet capable of plastic flow under pressure. It has been determined (as explained in Patent No. 2,111,695) that materials that are liquid at room temperature are not operable. The tubular blank to be formed into a fitting is filled with the slug of filler material either by (a) preforming a filler rod by casting large billets and extruding them into lengths of rod, sawing the lengths into small slugs, and inserting the small slugs into the blank, or (b) casting the filler slug directly into the blank. Pressure is applied to the slug to cause it to "flow" and form the tube into a wrought fitting, and the filler is then melted out and reused.

The casting technique for positioning the slug is advantage because of the relatively better fit that occurs between the slug and the inner wall of the blank. However, it does require expensive, complex equipment which is normally bulky, space-consuming, dirty, slow and smelly. Moreover, the casting equipment has high maintenance expense and involves high direct labor cost. Even though the cast filler slug does give a reasonably better fit than the rod insert technique, the cast slug does exhibit substantial shrinkage when it solidifies and cools, preventing the tube from being completely filled because of the shrinkage cavities created. The shrinkage is particularly pronounced on the end where the metal is poured in, but can also occur in other unpredictable locations in the tube, and sometimes over its entire length. The shrinkage prevents the full complement of filler material from being present, so that the resulting branch fitting will not be extended enough and the formed item will be scrap. Further, shrinkage cavities can prevent acceptable forming due to non-uniform pressures resulting inside the tubular blank during forming.

The technique of using a rod type insert slug eliminates the undesirable casting process and enables the rods to be cut to fairly close tolerance lengths for filler volume control. However, this technique also has definite disadvantages. It requires the molten metal to be first cast into billets which are cumbersome to handle. The billets must then be extruded into long rods. The rods are then cut into desired length slugs by a time-consuming and costly sawing operation. Problems with both the casting and insert rod variations cause a high scrap rate. This is a tremendous disadvantage, as can be readily appreciated.

Further, regarding the rod insert technique, since the extruded filler rod is extruded in long lengths and sawn into short segments of desired lengths, a substantial loss of the valuable filler metal occurs during the cut-off operation, even though care is used to try to collect as much of the sawn chips and dust as possible. The smaller the fitting and filler rod length, the greater is the percentage of filler material lost. Since this filler material is a substantially expensive material, any loss significantly increases the expense of operating. All of these cost-increasing factors are of utmost significance from a practical commercial production basis.

Another disadvantage possessed by both of these prior techniques is the difficulty of completely automating the production operations. In an industry such as this, where fractions of a cent determine practicality of production processes, the incapacity of a product to be adapted to automated forming is crucial.

It is an object of this invention to provide an improved method of forming a tubular blank into a branch type fitting using the basic technique of applying pressure to a plastic filler, but the improved method enhances the possibility of completely automating production of the fitting. It further does not require either the casting of a filler slug into the tubular blank, with its inherent problems, or the casting, extruding, and cutting to obtain insertable filler rod slugs.

Another object of this invention is to provide a novel method of forming branch type fittings from a tubular blank, using the plastic filler technique, wherein the exact amount of filler material can always be utilized, and wherein an unusually high percentage of acceptable product output is obtained, with a consequent small scrap rate. Moreover, the equipment necessary for practicing the improved method is compact, requiring only a small amount of floor space, is relatively clean, is capable of complete automation, and is simple in construction.

Another object of this invention is to provide a novel method of forming branch type fittings by the basic filler-flow-under-pressure technique, but wherein the filler material can be poured at room temperatures, but without using inoperable fillers that are liquid at room temperatures, enabling uniform internal pressures to be applied to the blank during forming, to obtain a high percentage of acceptable product, and wherein the filler can be conveniently melted and removed from the blank after forming, as usual.

These and other objects of this invention will become apparent upon studying the following specification in conjunction with the drawings in which.

First form of method

Figure 1M:
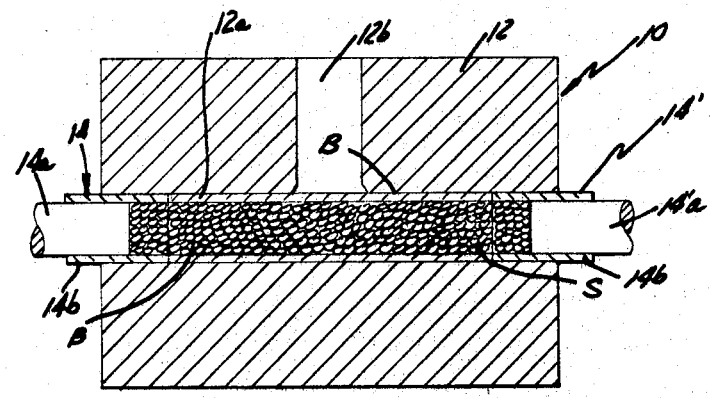
FIG. 1M is a sectional view of the forming assembly showing a modified form of the novel method, with a tubular blank inserted in a die, prior to the pressure forming operation.
Figures 1, 2:
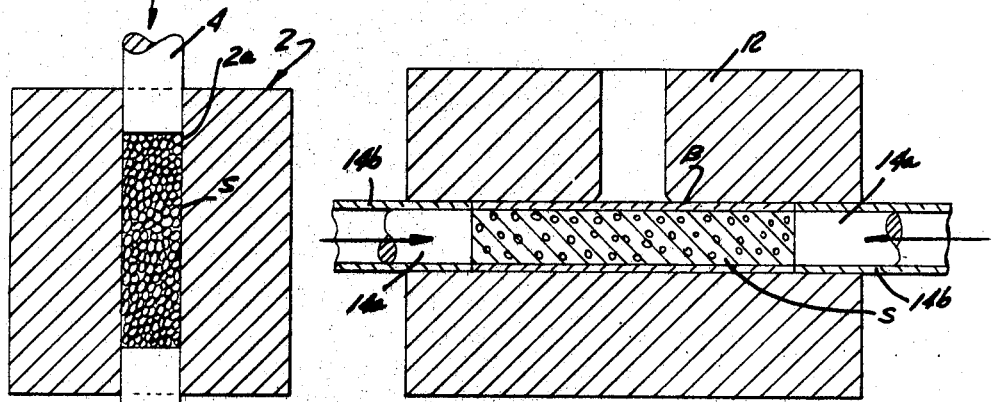
FIG. 1 is a sectional view of a slug forming die assembly, showing the formation of a slug from shot as one portion of the novel process.
FIG. 2 is a sectional view of the apparatus in FIG. 1, showing the apparatus after forming is partially complete.
Figure 3:
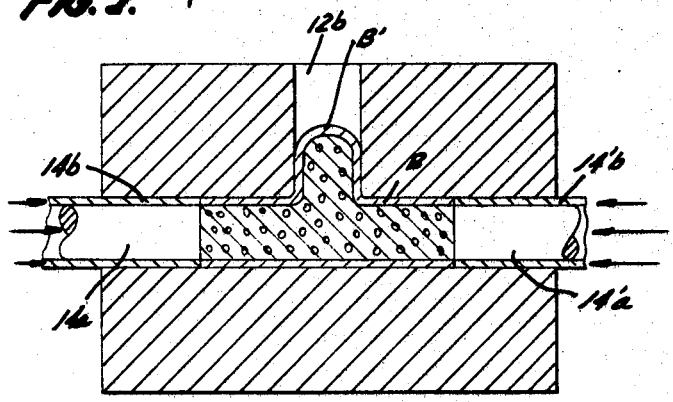
FIG. 3 is a sectional view of the apparatus in FIGS. 1 and 2, showing the forming operation substantially completed.

Referring to the drawings, the first form of the method can be understood with respect to the showing in FIGS. 1 through 3. In this first form of the method, the shot S is preformed into a slug of specific size, weight, and volume by compacting it in a special forming die assembly 2 which includes a central passage or forming cavity 2a, and a pair of cooperative, opposed forming plungers 4 and 4' operated by suitable power means (not shown). These plungers have a close sliding fit within passage 2a. By forcing these plungers into the cavity, shot S is formed into a self-supporting cylindrical slug by partial fusion of the shot members into each other. The resultant slug has a controlled volume due to control of the amount of movement of plungers 4 and 4'. It has a controlled weight by control of the amount of individual shot initially placed into forming cavity 2a. It has a controlled cylinder diameter and configuration, to match the inner diameter of a blank to be formed, by assuming that of the forming cavity. The nature of the slug is such that the outline of individual shot members can be discerned in the slug, but air pockets are completely removed.

The slug is then discharged from this forming cavity, inserted into a blank B such as the type shown in FIG. 2, and the combined blank and slug are inserted into forming die 12 of die assembly 10.

The complete die assembly 10 includes a forming die 12, and a pair of plunger assemblies 14 and 14'. These operate on the tubular blank B.

The die 12 includes an elongated passageway 12a open on both ends to allow plunger insertion, and includes at least one laterally extending forming passageway 12b extending transversely from passageway 12a to enable a lateral branch to be formed on the blank, to form a cross type fitting. The opposed plunger assemblies 14 and 14' trap the materials into the space formed by passageway 12a except for the controlled outlet 12b.

These opposed plunger assemblies 14 and 14' are each composed of a central plunger, i.e. 14a for plunger assembly 14, and 14'a for assembly 14', and a surrounding plunger sleeve, 14b for plunger assembly 14, and 14'b for plunger assembly 14'. These elements are operated by suitable power means such as typical hydraulic thrust means (not shown). The inner plunger rods 14a and 14'a may be operated independently of the outer sleeve plungers 14b and 14'b. This enables the central plungers and the plunger sleeves to be moved at different times or rates if desired, or they may operate simultaneously. During normal operation central plungers 14a and 14'a move simultaneously toward each other, and sleeves 14b and 14'b closely fit within the cylindrical bore 12a and plunger members 14a and 14'a closely fit within the inner diameters of the sleeves.

The core of this invention pertains to the nature of the filler material used in the operation. It has been discovered that the particular physical form of filler is important in several respects. Specifically, it has been discovered that by forming and using the filler in the form of globular elements S such as shot or pellets, greatly improved results occur that enable the process to have tremendous commercial potential. The globular pellets, with their rounded outer surface, enable a flowing action between the pellets when they are poured, but in production the pellets need not be completely spherical, although they can be. The individual pellets are preferably about $\frac{1}{16}$ inch in diameter, more or less. The filler material is a substance which is solid at room or ambient temperatures, which is basically incompressible, which has a capacity to flow under pressure in the manner of a plastic, i.e. with flow resistance, and having a melting point above room temperature but sufficiently below the temperature at which detrimental physical or chemical changes could occur in the material forming the fitting. The preferred filler material has an internal resistance and yield point similar to that of lead, and normally comprises what is generally known in the trade as Woods metal. This is an alloy of bismuth, lead, tin, and sometimes cadmium. The range variations set forth in Patent No. 2,111,695 mentioned above, illustrates the character of this alloy. Preferably the melting point ranges between about 65° C. and 111° C.

The wrought fittings formed by the method may be any of several, including copper, steel, aluminum, Monel metal, zinc, or magnesium. Although Woods metal can conceivably be substituted by some other filler material such as lead or other alloys of lead and having the characteristics described above, Woods metal is preferred. In the broader context of this invention, pellets of filler materials other than metal can be employed, e.g. the polymeric materials set forth in Patent No. 2,735,389, but the lead base materials, particularly Woods metal, is preferred.

The pellets of Woods metal filler are formed by shot-forming techniques. Equipment to achieve this shot fabrication is compact and simple, utilizing only a small amount of floor space. It is adapted to complete automation, thereby assisting greatly in reducing the cost of fabricating the cross fittings by this technique. Other techniques could be used.

The amount of filler material shot which is required to exactly fill the volume of a cross type fitting to be formed can be determined exactly. Thus, the exact amount of shot can be weighed out on an automated basis, or can be determined by measured volume. Since each shot particle is of very light weight, the total weight can be obtained with high accuracy. By measuring the weight, the specific volume is determined. The shot or pellets can be conveniently poured into the blank and die.

After blank B and the fused slug of shot are placed in die assembly 10, central plunger members 14a and 14'a, and cooperative outer plunger sleeve members 14b and 14'b are forced under pressure toward each other in controlled fashion against the blank and slug. The pressure against the ends of the tubular blank by members 14b and 14'b causes the blank to be compressed lengthwise to provide material while pressure on the filler material causes the filler material to fill the entire blank interior and force the tubular blank transversely to its normal axis into lateral passage 12b. This forms lateral branch B' of the cross type fitting being formed. During this operation, the filler material has a viscous flowing action to create the transverse fitting portion.

After pressure is removed by retraction of the plunger assemblies, a solidified body of filler material forms within the fitting. It is conveniently removed by heating the fitting and filler to a temperature above the melting point of the filler material to liquify it, so that it can be poured out and sent back through the shot forming equipment.

By utilizing this novel technique, costly, time consuming, and wasteful steps are eliminated. More specifically, it is no longer necessary to cast large billets or to handle such to be extruded, and it is no longer necessary to have the time consuming and wasteful sawing operations.

Modified second form of method

In the second form of the method, which can be illustrated with respect to FIGS. 1M, 2 and 3, the shot is not initially formed into a preformed slug and then inserted into the blank, but rather, the shot is poured into the blank and forming die assembly 10 in its loose flowable form in a manner illustrated in FIG. 1M.

Since the shot particles, when loosely placed together, initially have a substantial amount of air space therebetween, the amount of shot actually initially more than fills the blank, as shown in FIG. 1, so as to extend into the die. This apparent excess of shot is accommodated by backing the central plungers off while the plunger sleeves protrude into abutment with the ends of the blank.

This exact volume of Woods metal shot is then compressed in specific steps. Particularly, the inner plunger members 14a and 14'a are first advanced toward each other in the manner illustrated in FIG. 2 to push all of the pellets into the tubular blank, i.e. they move inside plunger sleeves 14b and 14'b until the inner ends of the central plunger members are generally coplanar with the inner ends of the plunger sleeves. The pellets are thereby partially compacted and pressed together due to their pliable condition. The tubular blank B at this stage has not yet been compressed (FIG. 2) or deformed. The blank is purposely made longer than the final length of the fitting according to teachings set forth in the mentioned prior patents.

Then, the outer plunger members 14b and 14'b are advanced toward each other simultaneously with the inner plunger members 14a and 14'a so that these plunger assemblies act as units. The pressure against the ends of the tubular blank causes the blank to be compressed lengthwise, while pressure on the filler material causes the filler material, still in semi-pellet condition, first to fill the entire blank interior, and then to fuse into a coherent mass that fills all crevices and cavities initially between the shot, to fill the entire blank and to contact the entire inner peripheral blank wall. As the compression continues, the filler material forces the tubular blank transversely to its normal axis into lateral passage 12b, to form the lateral branch B' of the cross type fitting to be formed. The plunger pressure on the ends of the blank assist in the deformation by reducing the overall length of the blank providing material for portion B'.

The shot type filler material therefore undergoes successive stages of flowing articulate solid shot, then partially fused shot, then fused in the form of a coherent body, then a flowing viscous body to create the transverse fitting portions, and after pressure is removed by retraction of the plunger assemblies, a solidified body within the formed fitting. It is removed by heating the fitting and filler to a temperature above the melting temperature of the filler material, to liquify it. The molten filler material is routed back into the liquid supply to the shot forming equipment.

It has been found with extensive experimentation that this improvement presents a very significant advance. The inventor does not profess to have a complete scientific explanation of the sequential events occurring in the process, and it should be realized that the above partial explanation of the sequence is only a report of what seems to be occurring. Regardless of the scientific explanation, the inventor and other employees of the assignee herein do realize that this improvement does accomplish a significant advance in the art.

The technique can now readily be completely automated, can be practiced at a substantial reduction in overall expense, is readily controlled, and involves only a minor scrap rate. It has made this technique widely adaptable to the forming of cross type fittings from wrought metal materials. The fittings can vary in size any where from a faction of an inch in diameter to several inches in diameter. It will be realized that other branch type fittings besides the T-fitting shown can be formed, e.g. crosses, etc., merely by providing a die with the approximately positioned and oriented number of lateral outlets like 12b. For each specific size, the exact amount of shot can be predetermined and can be obtained time and again by weight or volume measurement. No shrink cavities occur within the fitting to cause higher scrap rates. None of the valuable filler material is lost. The shot type material is readily handled, and can be poured into the blank in a manner similar to a liquid. Costly casting and sawing steps are eliminated.

It is realized that the improved method may seem rather simple once the above description and explanation are understood. Indeed, the very simplicity is one of the important aspects of the invention, especially in the light of the many advantages obtained, and of the long time between the discovery of the basic method in the late 1930's and this important improvement.

Other advantages will become apparent to those having ordinary skill in the art upon reading the description. It is also conceivable that certain minor deviations can be utilized without departing from the inventive concept set forth. Hence the invention is intended to be limited only by the scope of the appended claims and the reasonable equivalents thereto.

I claim:

1. A method of forming a branch type article from a tubular blank, including the steps of providing a tubular elongated blank of a predetermined width and length; measuring out a specific amount of shot of a filler material capable of compaction into a unitary body, and having viscous plastic flow characteristics as a body under high pressures; compacting said shot into a slug of a size slightly smaller in width than that of said tubular blank; confining said blank and slug, when said slug is interfitted in said blank, while providing at least one configurated relief zone adjacent the blank intermediate its ends; and pressing the blank and slug from their ends to force portions of the blank to be forced into said relief zone.

2. A method of forming a branch type article from a tubular blank, including the steps of providing a tubular elongated blank of a predetermined width and length; measuring out a specific amount of shot of a filler material capable of compaction into a unitary body, and having viscous plastic flow characteristics as a body under high pressures; compacting said shot into a slug of a size slightly smaller in width than that of said tubular blank; inserting said slug into said blank; confining said blank and slug while providing at least one configurated relief zone adjacent the blank intermediate its ends; and pressing the blank and slug from their ends to force portions of the blank to be forced into said relief zone.

3. A method of forming a branch type fitting from a tubular blank, including the steps of radially confining the blank, including its end portions, while providing at least one configurated relief zone adjacent the blank intermediate said end portions, the improvement comprising the steps of: over-filling the blank with a predetermined over-fill of small solid pellets of a filler material which is capable of compaction into a unitary body, which has no significant compressibility, and which has viscous plastic flow characteristics under pressure; compacting the shot from opposite ends of the tubular blank, and further pressing the body from the ends of the blank while pressing the ends of the blank, to cause the filler material to fill the blank and to form the blank into a fitting.

4. A method of forming a branch type fitting with at least one lateral branch, from a tubular blank, comprising the steps of radially confining a substantial share of the blank, including its end portions, while providing a controlled configuration relief zone adjacent the blank intermediate said end portions for each lateral branch to be formed; over-filling the blank with a predetermined over-fill of shot of a filler material capable of compaction into a unitary body, and having viscous plastic flow characteristics under pressure when compacted into a unitary body; compressing the filler material shot from opposite ends of the tubular blank into a compacted body in said blank, and pressing the filler body further to cause the material to flow into and to cause portions of the blank to be formed into said relief zone to form the branch type fitting.

5. The method in claim 1 characterized by said shot being small globules of Woods metal, and the body of Woods metal being melted out of said fitting after its formation.

6. The method in claim 1 characterized by the further steps of said body of filler material being melted out of said fitting as a liquid after the fitting is formed, and said liquid filler being converted back to shot and reinserted into another blank for pressure formation of another fitting.

References Cited

UNITED STATES PATENTS

| 2,111,695 | 3/1938 | Seeber et al. | 72—61 |
| 3,216,092 | 11/1965 | Arbogast | 29—421 |

FOREIGN PATENTS

| 14,747 | 8/1898 | Great Britain. |

CHARLES W. LANHAM, *Primary Examiner.*

L. A. LARSON, *Assistant Examiner.*